2 Sheets—Sheet 1.

P. CROSBY.

Re-Sawing Machine.

No. 458.

Reissued Apr. 28, 1857.

Witnesses

Wm H Bishop

Inventor

Pearson Crosby

2 Sheets—Sheet 2.
P. CROSBY.
Re-Sawing Machine.
No. 458.
Reissued Apr. 28. 1857
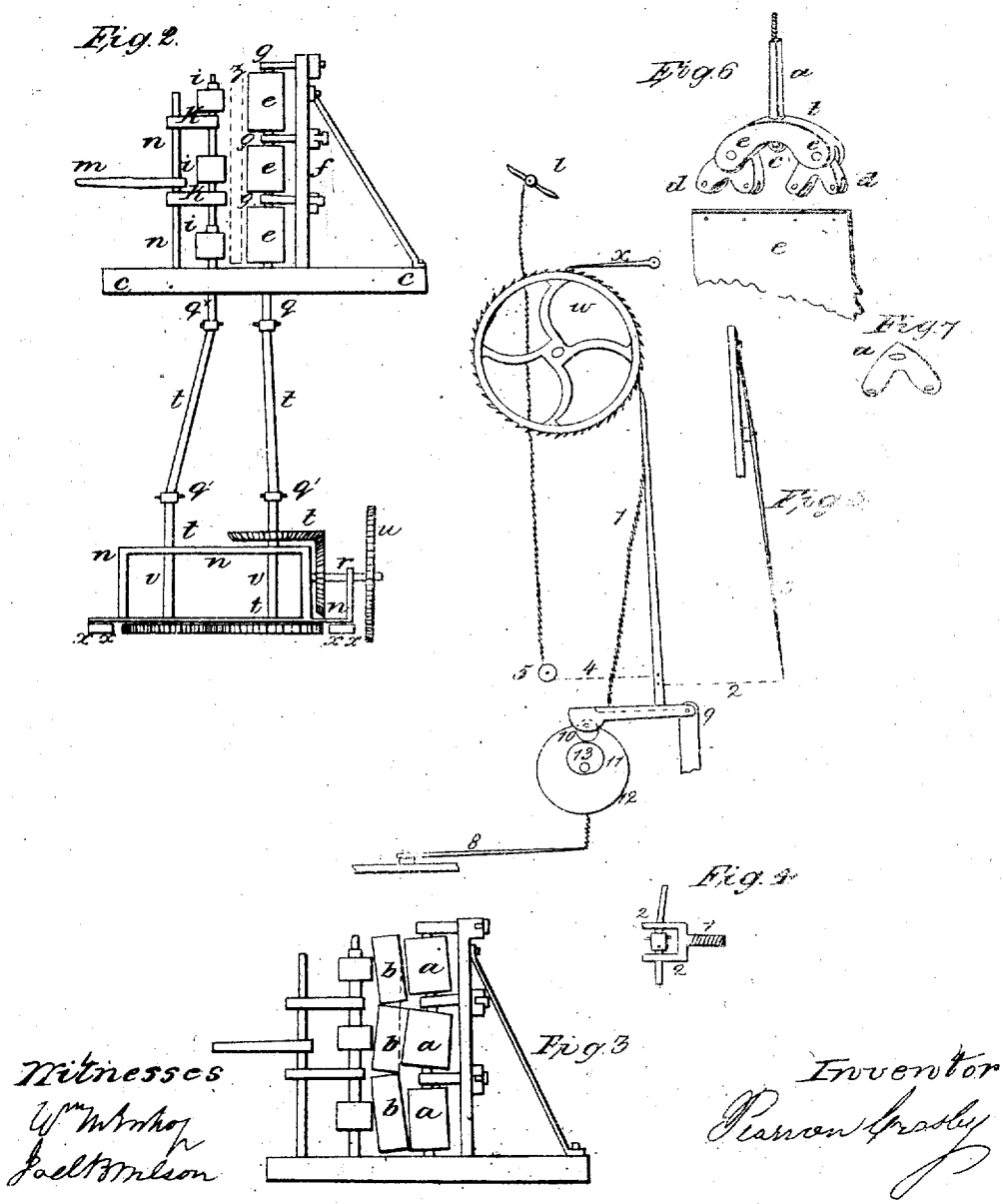

BEST AVAILABLE COPY

UNITED STATES PATENT OFFICE.

PEARSON CROSBY, OF FREDONIA, NEW YORK.

IMPROVED SAW-MILL FOR RESAWING BOARDS AND OTHER LUMBER.

Specification forming part of Letters Patent No. 2,321, dated November 3, 1841; Reissue No. 130, dated March 10, 1849; Extended October 30, 18 5; Reissue No. 458, dated April 28, 1857.

*To all whom it may concern:*

Be it known that I, PEARSON CROSBY, of Fredonia, in the State of New York, have invented certain new and useful Improvements in Saw-Mills for Resawing Boards and other Lumber; and I do hereby declare that the following is a full, clear, and exact description thereof, reference being had to the accompanying drawings, making part of this specification, in which—

Figure 1X:
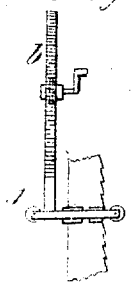
Figure 1:
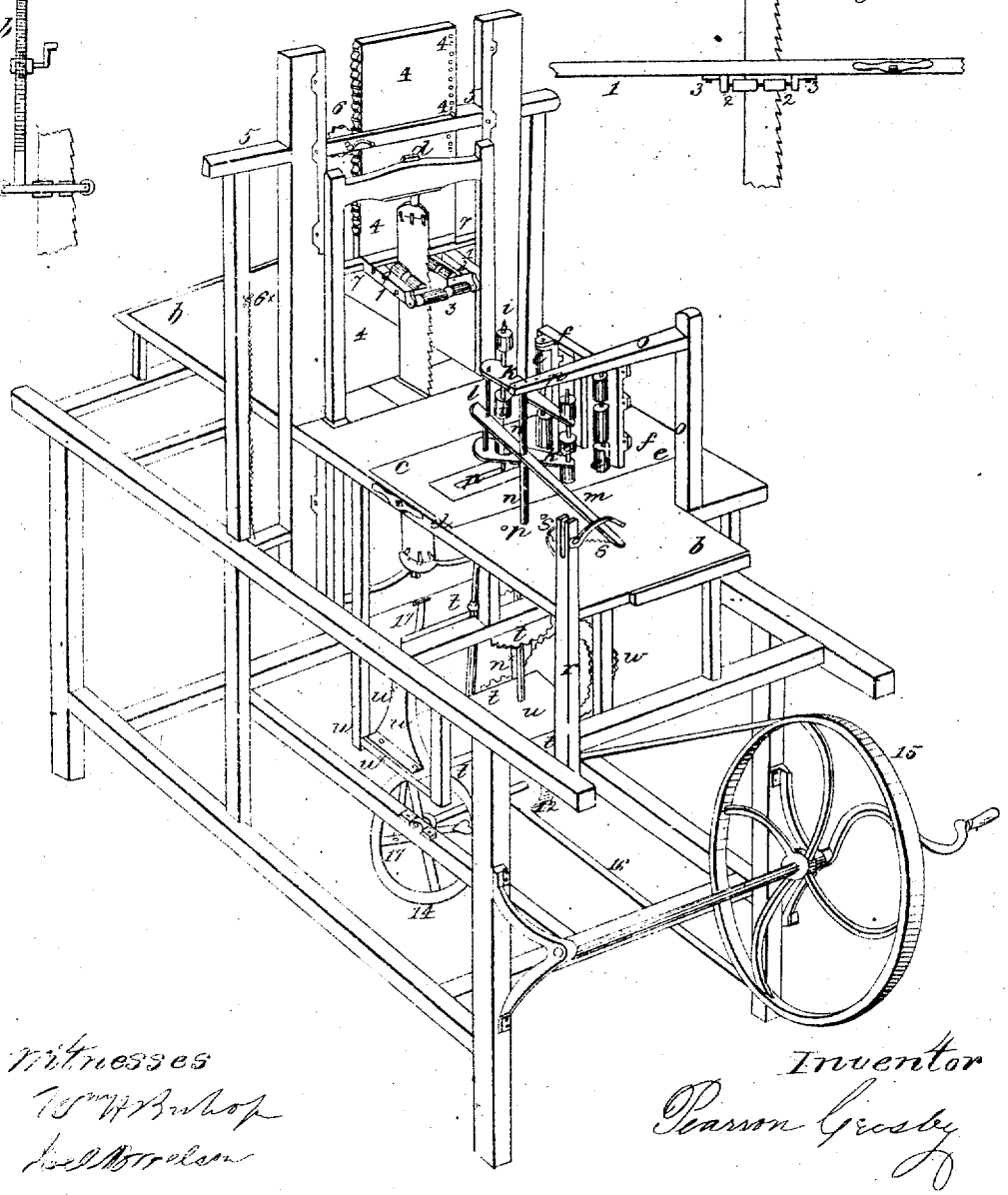
Figure 1X:
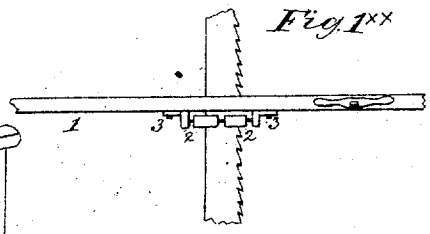

Figure 1 is a perspective view of the machine; Fig. 2, a vertical section of the apparatus for gaging, controlling, presenting, and feeding the boards; and Fig. 3, a vertical section of a modification thereof.

The other figures, representing some of the details, will be referred to hereinafter; but in all the figures the same letters indicate like parts.

In resawing lumber, and particularly in resawing thin boards, it is of the utmost importance that the board be presented and moved to the cutting action in the plane of the saw, for if there be any deviation from this the sawing becomes imperfect, the saw is strained and bent, and the line of cut is liable to be carried out of the required track, so that neither of the boards produced will be of an equal thickness. It is well known that much of the lumber brought to market, which requires to be resawed, sometimes into very thin boards, is more or less warped or bent in the direction of the length or breadth, or both, and hence a saw-mill to be practically adapted to this purpose must be capable of resawing such as well as straight lumber. In the well-known veneering saw-mills this can be done, because the piece to be resawed is previously placed along its entire length against the vertical face of a carriage parallel with the plane of the saw, and secured to such face, so that it can be firmly held and prevented from bending, and, if desired, the warps and bends can be forced out in securing it to the face of the carriage; but this mode of procedure is attended with great labor and consumption of time, and for any other purpose than that of cutting veneers from very costly lumber is in every respect too expensive.

Now, the object of my said invention is to resaw boards as they are found in the market by a self adapting or automatic mechanism operating in such a manner that one of the boards produced by each resawing will be of a uniform or equal thickness from end to end, however the original board may be bent or warped or vary in thickness from end to end, and to produce a like result on any number of boards in succession, however they may vary from each other in thickness; and to this end my said invention consists in combining with the saw of any suitable kind and operating in any suitable manner a mechanism for gaging one face of the board to be sawed and guiding it in a plane parallel with the plane of the saw, and a self-adapting mechanism for making pressure on the opposite face of the board to hold that face of the board which is to be gaged in contact with the gaging and guiding mechanism as it is advanced to the cutting-edge of the saw, the said gaging and guiding and the said self-adapting mechanism being such as to force and hold the gaged face of the board against the face of the gage, and to force or bend out the warps or bends of the plank when they are warped or bent, the said gaging and guiding mechanism consisting of two parallel rollers or an equivalent therefor, and the said self-adapting mechanism consisting of two yielding pressure-rollers or an equivalent therefor, under the said combination And my said invention also consists in connecting the gaging and the self-adapting pressure-rollers, or either, when the principle of the first part of my invention is applied by means of rollers, with the mechanism for imparting motion to them by means of universal joints, that the axis of the gaging-rollers may be maintained in a plane parallel with the plane of the saw at whatever distance from the plane of the saw they may be placed, and that the rollers which force the board against the gage-rollers or other gage may adapt themselves to the face of the boards, however the boards may vary in thickness one from another, or from end to end or from edge to edge.

And my invention also consists in the method of straining the saw by means of two stirrups—one secured to the end of the saw toward the back edge and the other toward the front edge— and these two stirrups in turn being connected by a play-joint with a third or straining stirrup connected with the saw frame or gate.

The frame represented in the accompanying drawings is adapted to the purpose, but may be varied at pleasure. The saw-frame is much lighter and narrower than the ordinary one. I strain the saw by the following contrivance: Instead of the common stirrup, I use bolts, as at Figs. 1 and 6, which pass through the upper and lower girts of the gate, and are secured and strained by nuts. One end of the bolt is fastened and passes through a stirrup, *b*, Fig. 6, which rests on a pin passing through said bolt, as at *c*. The stirrup is susceptible of a vibration as well as a lateral movement. At each end of this stirrup is another stirrup, in form of an inverted V, as at *d d*, resting on pins *e e*. These stirrups also may vibrate and move laterally by means of oblong holes, as at *a*, Fig. 7. The ends of stirrup *b* are open or slit, so as to receive the end *a*, Fig. 7. The lower ends of the stirrups *d d* are also open or split, so as to receive the saw of which *e* is a section. The holes in the saw and in the stirrups *d d* are to receive pins or rivets. By means of the oblong holes, as *a*, Fig. 7, the saw may have an equal strain, and by a lateral shift of stirrup *b* on the pin *c* the strain may be thrown on the front of the saw and give the saw more or less rake. By means of a bolt, as *a*, Fig. 6, passing through the center of each girt, not only the saw is kept in place, but the gate is kept in proper trim or balance, and not allowed to twist or warp, and this construction requires much less weight of metal or material.

In addition to the straining apparatus already described for stiffening the saw, I use the following apparatus, similar to that described in Letters Patent granted to me June 7, 1838.

In order to be able to use a very thin saw, I make use of the following contrivance for keeping the saw true and preventing its running aside: Between the two center posts of the frame, and at suitable height, is placed the stock 1 1, Fig. 1, containing the rollers 2 2, between which the saw moves. By regulating-screws these are kept in place. A grooved roller, 3, in front of the saw is used for the purpose of keeping the board from rising, and opposite to this and back of the saw is another like roller. (Not visible in the drawings.) 4 4 is a piece extending up from the stock, passing through a mortise or opening in the frame-piece 5 5 with the rack 6. In the frame-piece 5 5 is a pinion below 6, by which the rack is raised or lowered to regulate the height of the stock and rollers. On the right, in the piece 4 4, is a series of holes, 4 4, to receive a pin to retain or hold up the piece 4 with the stock and rollers. Instead of a series of holes and a pin, a ratchet and hand may be used for this purpose. The ratchet may be on the shaft of the pinion which raises the rack. The cross part 7 7 is a horizontal extension of 4 4, sliding against the upright fender-posts, to keep the piece 4 4 and stock and rollers steady. There is also another stationary stock and rollers below the platform *b b*, for the same purpose of regulating or steadying the saw. The rollers are out of view in Fig. 1, but represented in the sectional Fig. 1[illegible] of the platform *b b*.

To hold the board or plank to be sawed, I use the following apparatus: On the platform *b b*, Fig. 1, is a cross-slide platform or carriage, *c c*, which is moved laterally on the first platform by means of a set-screw, as at *d*, Fig. 1. On this platform *c c* are arranged the vertical rest or gage rollers *e e*, Figs. 1 and 2. Figs. 1 and 2 is a metal frame to support the rollers, which in these figures are represented as being on one shaft having the projecting bearings *g g g*, Fig. 2, and the lower bearings are in the platform *c c*, Figs. 1 and 2. There is another set of rollers at *i i i*, Figs. 1 and 2. These last also consist of two sets corresponding with the first set, *e e*. By the horizontal pieces *k k* the sets are connected, and they form bearings and supports for them. Through the pieces *k k* passes a shaft, *l*, which also passes through the lever *m*, which lever *m* has for its fulcrum the shaft *n n*, and this shaft *n n* is supported at the top by the frame *o o*. By an arrangement of holes or bearings *p p* the position of the shaft *n n* may be shifted to suit different thicknesses of timber. The shaft *l* is placed in the pieces or levers *k k*, so as to come sufficiently between the two sets of rollers *i i* to have a partial effect of the lever *m* on the near rollers, or those which introduce the boards. The lower part of the shaft of the rollers passes down through a slot, *p*, in the slide *c c*. (See *q*, Fig. 2.) The board, an end view of which is represented by the dots L, being placed between the rollers, then by means of the lever *m*, which possesses suitable elasticity, and the winch-drum, cord, and ratchet and hand, as at *s s*, Fig. 1, the rollers connected with the lever press the board against the rollers *e e*, and thus grip the board. The shaft of the rest or gage rollers *e e* passes through the platform *c c*, as seen at the right hand *q*, Fig. 2. The lateral movement of the carriage *c c*, by means of the set-screw *d*, Fig. 1, is for the purpose of regulating the thickness to be cut, as the rollers in the frame *f f* are by this means thrown nearer to or farther from the plane of the saw. The rollers on each side of the board turn in toward each other to advance the board toward the saw, and the rollers on each side nearest the saw have the shafts extended down to the driving-wheels *t*, Figs. 1 and 2; and *u u u*, Figs. 1 and 2, is a frame-work which supports and holds the parallel posts V V of the shafts, which retain the same relative position to each other. This frame-work *u u* is supported by the timbers $u^x$ and $V^x$. As the rollers *e e* and *i i*, to accommodate different thicknesses of stuff, require either to approach to or recede from each other, it is requisite to use universal joints in the axles, as at $q^x$ *q q′ q′*, Fig. 2,

BEST AVAILABLE COPY

W, Fig. 2, being the feeding-ratchet on the same shaft with the miter-wheel Z and W. Fig. 5 is a side view of the said feeding-ratchet with the pawl. *y* is the feeding-rod which moves the ratchet. The lower end of this feeding-rod rests on the horizontal piece or lever 1. This lever has a groove (represented by the dots) in which the tongued base of the feeding-rod rests. 2 is a cord attached to the rod, and also to the end of a spring, 3, which may be of wood or metal, of suitable length to give the requisite motion. 4 is a cord attached to the feeding rod or hand, which passes around a pulley, 5, and extends up to a fastening, 6, convenient to the tender. 6*, Fig. 1, is the fastening. 7, Fig. 5, is a cord attached to the feeding-hand near the top, which extends downward to a horizontal spring, 8. The position and arrangement of parts represented by 2, 3, 4, 5, and 6 are to place and retain the hand *y* on any part of the lever on a portion of the frame of the mill. 10 is a roller in the end of lever 1, on which plays the eccentric driver 11. The circle 12 represents the driving-pulley 12 of Fig. 1. 13, Fig. 5, is the shaft of the eccentric driver 11, pulley 12, and fly 14, driven by wheel 15 and belt 16 of Fig. 1. 17 17, Fig. 1, is the connecting-rod between the crank-pin on the fly-wheel and the gate.

To saw diagonally the feeding-rollers at the right, as *a a a*, Fig. 3, are put in the position represented in this figure by means of universal joints between the rollers, made and mounted as represented at 1 2 in the sectional Fig. 4. *b b b*, Fig. 3, are pieces of stuff to be sawed, confined by the feeding-rollers. The dotted lines represent the line of the cut of the saw.

Instead of three rollers, one above the other, more or less may be substituted.

From the foregoing it will be seen that the saw-gate is operated by crank motion in the usual manner, and that the saw, which should be thin for the purpose of resawing boards, is guided and kept true in its motions by the guide-rollers 2 2; but as no part of this arrangement makes part of my present invention other suitable arrangements may be substituted at the pleasure of the constructer.

The board to be resawed or slitted is introduced between two sets of rollers, *e e* and *i i*, with one edge resting on the platform *b* of the frame, and its surface gripped between the two sets of rollers by drawing the lever *m*, which causes the rollers *i i* to operate as pressure-rollers. When thus gripped, the board is carried forward or fed to the edge of the saw by means of the rotating motion given to the rollers, thus constituting them at the same time feed-rollers; and while the board is acted upon by the saw it is prevented from being lifted up by passing under the rollers 3 3, the position of which is regulated to suit different widths of boards by the sliding and adjustable frame-work in which they are hung.

As the gaging and guiding apparatus is placed near to the cutting-edge of the saw, and the self-adapting pressure apparatus effects the gripping of the board against the gaging apparatus and across the entire breadth of the board, and with a force sufficient to bend out the warps or bends, and to hold the board firmly during the cutting action of the saw, it follows that however the board may be warped or bent it will be presented to the cutting action of the saw in a straight plane parallel with the plane of the saw, although after passing the saw the two parts into which it is divided will resume the warps or bends of the orginal board, so that in constructing such a machine care must be taken not to place the gaging, guiding, and pressing apparatus at too great a distance from the cutting-edge of the saw; and whatever modification may be made in the mechanism for gaging and guiding the board, and for making pressure to hold it against the gage or guide, they must, in combination, perform the function of bending out the warps or bends of the boards if they be bent or warped in the direction of the length or breadth, or both, and keeping them straight along that portion of their length for the time being which extends to the cutting-edge of the saw, and the pressing apparatus must extend across the entire breadth of the boards, and in making pressure must be self-adapting to the varying thickness of the boards, not only in the direction of the length, but also in the direction of the breadth, that its gaged face may be maintained in the required plane, whether its upper edge be of the same or of greater or less thickness than its lower edge; and if the machine be intended for slitting boards to different thicknesses, the gaging apparatus must be capable of ready adjustment toward or from the plane of the saw; but as an equivalent therefor the saw-frame, or that which controls the saw, may be made to shift toward or from the gage, although I prefer the shifting of the gaging apparatus.

And although I have above described the gaging and pressure apparatus as performing also the operation of feeding or advancing the board to the saw, it will be obvious that the feeding operation may be performed by other means, in which case the gaging and directing function may be performed by a flat gage or other equivalent means, provided it presents a surface of sufficient extent against which to press that face of the board which is to be gaged, that the warps or bends may be forced out if the board be warped or bent; and so with the apparatus for making pressure against the opposite face of the board. Although rollers for this purpose are, in my judgment, the best, nevertheless, if other means be employed for feeding or advancing the board, non-rotating bars may be employed, provided they be so arranged as to make the required pressure on the face of the board, and they be made self-adapting to the varying thickness of the board, as before described; and although two rollers or bars are required for making pressure, when the gaging apparatus consists of two rollers a single roller or bar may be substituted as an inferior equivalent when a plate is substituted for two rollers as a means of gaging and guiding, as it will be obvious that a single pair of rollers—one for gaging and the other for making pressure—cannot bend out the warps or bends of the board nor guide it in the plane of the saw, nor can a single roller for making pressure answer the purpose in combination with two gage-rollers for gaging and guiding, for if placed opposite to one of the gage-rollers they will simply act as a single pair, and if placed opposite the space between the two gage-rollers there will be no resisting-surface opposite the line of pressure, and in consequence, if the pressure applied be sufficient to bend out the warps of the stiffest part of a plank, which is a necessary condition, it will bend the weak parts too much, and hence fail to present the board in a true plane to the action of the saw.

And although I prefer the mode herein described of hanging and straining the saw, as it enables me to use a thinner saw than by the use of any other known means, nevertheless I do not wish to be understood as limiting myself to the use of all the parts of my invention in connection, as the mode of gaging, guiding, and presenting the board may be advantageously employed in connection with any other mode of straining the saw, or, in fact, with any kind of mill-saw suitable to slitting boards.

What I claim as my invention, and desire to secure by Letters Patent; is—

1. The mode of operation, substantially as herein described, of gaging, guiding, and presenting boards to the action of a saw, which mode of operation results from combining with a slitting-saw the mechanism, substantially as described, for gaging and guiding one face of the boards, and the mechanism for making a self-adjusting pressure, substantially as described, on the opposite face of the boards, so that the boards will be clamped between the two said mechanisms on opposite faces and immediately in front of the cutting-edge of the saw, so as to present the gaged face of the boards, however warped or bent they may be, in a plane parallel with the plane of the saw, as set forth.

2. In combination with a slitting saw and the arrangement of the gage and pressure rollers, substantially as described, connecting the said gage and pressure rollers with the mechanism from which they derive motion by means of universal joints, substantially as and for the purpose specified.

3. The method, substantially as herein described, of hanging and straining the saw by the combication of the three stirrups at the ends of the saw, constructed and connected in manner substantially as herein described.

PEARSON CROSBY.

Witnesses:
WM. H. BISHOP,
JOEL B. WILSON.